(12) United States Patent
Monastiriotis et al.

(10) Patent No.: US 10,696,896 B2
(45) Date of Patent: Jun. 30, 2020

(54) DURABLE COATINGS AND USES THEREOF

(71) Applicant: PREFERRED TECHNOLOGY, LLC, Radnor, PA (US)

(72) Inventors: Spyridon Monastiriotis, Houston, TX (US); Yu-Chin Li, Houston, TX (US)

(73) Assignee: PREFFERRED TECHNOLOGY, LLC, Radnor, PA (US)

( * ) Notice: Subject to any disclaimer, the term of this patent is extended or adjusted under 35 U.S.C. 154(b) by 0 days.

(21) Appl. No.: 15/823,699

(22) Filed: Nov. 28, 2017

(65) Prior Publication Data

US 2018/0148636 A1    May 31, 2018

Related U.S. Application Data

(60) Provisional application No. 62/426,888, filed on Nov. 28, 2016.

(51) Int. Cl.

| | |
|---|---|
| *C09K 8/80* | (2006.01) |
| *C09D 175/04* | (2006.01) |
| *E21B 43/267* | (2006.01) |
| *E21B 43/25* | (2006.01) |
| *E21B 43/16* | (2006.01) |
| *C08G 18/42* | (2006.01) |
| *C09D 175/08* | (2006.01) |
| *C08G 18/76* | (2006.01) |
| *C09D 175/06* | (2006.01) |
| *C08G 18/44* | (2006.01) |

(52) U.S. Cl.
CPC .......... *C09K 8/805* (2013.01); *C08G 18/4236* (2013.01); *C08G 18/44* (2013.01); *C08G 18/7671* (2013.01); *C09D 175/04* (2013.01); *C09D 175/06* (2013.01); *C09D 175/08* (2013.01)

(58) Field of Classification Search
CPC ............... C09D 175/04; C09D 175/00; B32B 2255/26; C09K 8/805
See application file for complete search history.

(56) References Cited

U.S. PATENT DOCUMENTS

| | | | |
|---|---|---|---|
| 2,163,972 | A | 6/1939 | Anderson |
| 2,366,007 | A | 12/1944 | D'Alelio |

(Continued)

FOREIGN PATENT DOCUMENTS

| | | | |
|---|---|---|---|
| CA | 1087833 A | 10/1980 | |
| CA | 2423031 A1 | 10/2003 | |

(Continued)

OTHER PUBLICATIONS

Office Action dated Jun. 6, 2017 in U.S. Appl. No. 14/528,070.

(Continued)

*Primary Examiner* — Zakiya W Bates
(74) *Attorney, Agent, or Firm* — Pepper Hamilton LLP

(57) ABSTRACT

Coatings and compositions for coating particulates are described that can be used as, for example, as proppants to, for example, extract oil and gas from subterranean formations. The coatings can be, for example, an inner coating adjacent to the particulate comprising a polyurethane and an outer coating comprising an polyurethane dispersion; a coating comprising a polyurethane admixed with a polyurethane dispersion; or a polyurethane dispersion layer and is free of an inner polyurethane layer.

20 Claims, 3 Drawing Sheets

(56) References Cited

U.S. PATENT DOCUMENTS

| | | |
|---|---|---|
| 2,653,089 A | 9/1953 | Bulson |
| 2,823,753 A | 2/1958 | Henderson |
| 3,020,250 A | 2/1962 | Norwalk |
| 3,026,938 A | 3/1962 | Huitt |
| 3,392,148 A | 7/1968 | Hunter |
| 3,492,147 A | 1/1970 | Young et al. |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham et al. |
| 3,931,428 A | 1/1976 | Reick |
| 3,971,751 A | 7/1976 | Isayama et al. |
| 3,976,135 A | 8/1976 | Anderson |
| 3,991,225 A | 11/1976 | Blouin |
| 4,074,760 A | 2/1978 | Copeland et al. |
| 4,102,703 A | 7/1978 | Tully |
| 4,113,014 A | 9/1978 | Kubens et al. |
| 4,177,228 A | 12/1979 | Prolss |
| 4,199,484 A | 4/1980 | Murphey |
| 4,252,655 A | 2/1981 | Carney |
| 4,273,910 A | 6/1981 | Lederer |
| 4,417,992 A | 11/1983 | Bhattacharyya et al. |
| 4,439,489 A | 3/1984 | Johnson et al. |
| 4,443,347 A | 4/1984 | Underdown et al. |
| 4,465,815 A | 8/1984 | Chattha |
| 4,493,875 A | 1/1985 | Beck et al. |
| 4,518,039 A | 5/1985 | Graham et al. |
| 4,547,469 A | 10/1985 | Jackson et al. |
| 4,553,596 A | 11/1985 | Graham et al. |
| 4,554,188 A | 11/1985 | Holubka et al. |
| 4,580,633 A | 4/1986 | Watkins et al. |
| 4,585,064 A | 4/1986 | Graham et al. |
| 4,592,931 A | 6/1986 | Cargle |
| 4,594,268 A | 6/1986 | Kirwin |
| 4,623,589 A | 11/1986 | Simmonds, Jr. |
| 4,632,876 A | 12/1986 | Laird et al. |
| 4,680,230 A | 7/1987 | Gibb et al. |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |
| 4,920,192 A | 4/1990 | Wiser-Halladay |
| 5,048,608 A | 9/1991 | Wiser-Halladay et al. |
| 5,073,195 A | 12/1991 | Cuthbert et al. |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta et al. |
| 5,218,038 A | 6/1993 | Johnson et al. |
| 5,242,248 A | 9/1993 | Bramwell |
| 5,256,729 A | 10/1993 | Kutta et al. |
| 5,264,572 A | 11/1993 | Endo et al. |
| 5,330,836 A | 7/1994 | Buese et al. |
| 5,376,629 A | 12/1994 | Smith |
| 5,420,174 A | 5/1995 | Dewprashad |
| 5,422,183 A | 6/1995 | Sinclair et al. |
| 5,480,584 A | 1/1996 | Urano et al. |
| 5,582,249 A | 12/1996 | Caveny et al. |
| 5,597,784 A | 1/1997 | Sinclair et al. |
| 5,721,315 A | 2/1998 | Evans et al. |
| 5,728,302 A | 3/1998 | Connor et al. |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A | 7/1999 | Nguyen et al. |
| 5,955,144 A | 9/1999 | Sinclair et al. |
| 5,964,291 A | 10/1999 | Bourne et al. |
| 5,985,986 A | 11/1999 | Kubitza et al. |
| 6,003,600 A | 12/1999 | Nguyen et al. |
| 6,071,990 A | 6/2000 | Yip et al. |
| 6,079,492 A | 6/2000 | Hoogteijling et al. |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans et al. |
| 6,316,105 B1 | 11/2001 | Khudyakov et al. |
| 6,328,105 B1 | 12/2001 | Betzold |
| 6,372,842 B1 | 4/2002 | Grisso et al. |
| 6,387,501 B1 | 5/2002 | McCrary et al. |
| 6,406,789 B1 | 6/2002 | McDaniel et al. |
| 6,413,647 B1 | 7/2002 | Hayashi et al. |
| 6,439,309 B1 | 8/2002 | Matherly et al. |
| 6,486,287 B2 | 11/2002 | McGall et al. |
| 6,528,157 B1 | 3/2003 | Hussain et al. |
| 6,582,819 B2 | 6/2003 | McDaniel et al. |
| 6,632,527 B1 | 10/2003 | McDaniel et al. |
| 6,668,926 B2 | 12/2003 | Nguyen et al. |
| 6,705,400 B1 | 3/2004 | Nguyen et al. |
| 6,732,800 B2 | 5/2004 | Acock et al. |
| 6,756,124 B2 | 6/2004 | Kanamori et al. |
| 6,767,978 B2 | 7/2004 | Aubart et al. |
| 6,790,245 B2 | 9/2004 | Wolff et al. |
| 6,809,149 B2 | 10/2004 | Meyer et al. |
| 6,866,099 B2 | 3/2005 | Nguyen |
| 6,875,728 B2 | 4/2005 | Gupta et al. |
| 6,904,972 B2 | 6/2005 | Zhang et al. |
| 6,906,009 B2 | 6/2005 | Shinbach et al. |
| 6,913,080 B2 | 7/2005 | Lehman et al. |
| 7,012,043 B2 | 3/2006 | Klein et al. |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 | 11/2006 | Sinclair et al. |
| 7,153,575 B2 | 12/2006 | Anderson et al. |
| 7,157,021 B2 | 1/2007 | Bytnar et al. |
| 7,216,711 B2 | 5/2007 | Nguyen et al. |
| 7,244,492 B2 | 7/2007 | Sinclair et al. |
| 7,247,350 B2 | 7/2007 | Sepeur et al. |
| 7,261,156 B2 | 8/2007 | Nguyen et al. |
| 7,270,879 B2 | 9/2007 | McCrary |
| 7,281,580 B2 | 10/2007 | Parker et al. |
| 7,281,581 B2 | 10/2007 | Nguyen et al. |
| 7,318,472 B2 | 1/2008 | Smith |
| 7,318,474 B2 | 1/2008 | Welton et al. |
| 7,322,411 B2 | 1/2008 | Brannon et al. |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft et al. |
| 7,344,783 B2 | 3/2008 | Shea |
| 7,350,571 B2 | 4/2008 | Nguyen et al. |
| 7,399,715 B2 | 7/2008 | Tsuchiya et al. |
| 7,407,010 B2 | 8/2008 | Rickman et al. |
| 7,528,096 B2 | 5/2009 | Brannon et al. |
| 7,537,702 B2 | 5/2009 | Lupton et al. |
| 7,541,318 B2 | 6/2009 | Weaver et al. |
| 7,624,802 B2 | 12/2009 | McCrary et al. |
| 7,678,872 B2 | 3/2010 | Glass et al. |
| 7,721,804 B2 | 5/2010 | Duenckel |
| 7,726,399 B2 | 6/2010 | Brannon et al. |
| 7,754,659 B2 | 7/2010 | Rediger et al. |
| 7,772,163 B1 | 8/2010 | Brannon et al. |
| 7,789,147 B2 | 9/2010 | Brannon et al. |
| 7,803,742 B2 | 9/2010 | Bicerano et al. |
| 7,884,043 B2 | 2/2011 | Lisetskiy et al. |
| 7,896,080 B1 | 3/2011 | Walters et al. |
| 7,919,183 B2 | 4/2011 | McDaniel et al. |
| 7,921,910 B2 | 4/2011 | Wilson et al. |
| 7,932,295 B2 | 4/2011 | Tsuchiya et al. |
| 7,999,013 B2 | 8/2011 | Brown |

(56) References Cited

U.S. PATENT DOCUMENTS

| | | | |
|---|---|---|---|
| 8,006,754 B2 | 8/2011 | Bicerano | |
| 8,006,755 B2 | 8/2011 | Bicerano | |
| 8,052,890 B2 | 11/2011 | Nguyen | |
| 8,133,587 B2 | 3/2012 | Rediger et al. | |
| 8,183,179 B2 | 5/2012 | Garcia-Lopez De Victoria et al. | |
| 8,236,738 B2 | 8/2012 | Zhang | |
| 8,258,206 B2 | 9/2012 | Kanagasabapathy et al. | |
| 8,298,667 B2 | 10/2012 | Smith et al. | |
| 8,338,351 B2 | 12/2012 | Kanagasabapathy et al. | |
| 8,349,911 B2 | 1/2013 | Kuehnle | |
| 8,354,279 B2 | 1/2013 | Nguyen et al. | |
| 8,360,149 B2 | 1/2013 | Hughes et al. | |
| 8,431,220 B2 | 4/2013 | Wu et al. | |
| 8,513,342 B2 | 8/2013 | Gao et al. | |
| 8,524,441 B2 | 9/2013 | Zhang et al. | |
| 8,592,015 B2 | 11/2013 | Bicker et al. | |
| 8,664,151 B2 * | 3/2014 | Haeberle | B26B 21/4012 502/402 |
| 8,763,700 B2 | 7/2014 | McDaniel et al. | |
| 8,778,495 B2 | 7/2014 | Rediger et al. | |
| 8,785,356 B2 | 7/2014 | Plotnikov et al. | |
| 8,796,188 B2 | 8/2014 | Pisklak et al. | |
| 8,800,658 B2 | 8/2014 | Zhang | |
| 8,936,083 B2 | 1/2015 | Nguyen | |
| 9,040,467 B2 | 5/2015 | McDaniel et al. | |
| 9,097,996 B2 | 8/2015 | Hille | |
| 9,487,692 B2 | 11/2016 | Nguyen et al. | |
| 9,523,030 B2 | 12/2016 | Zhang | |
| 9,624,421 B2 | 4/2017 | McDaniel et al. | |
| 2001/0014453 A1 | 8/2001 | McGall et al. | |
| 2002/0048676 A1 | 4/2002 | McDaniel et al. | |
| 2003/0102128 A1 | 6/2003 | Dawson et al. | |
| 2003/0131998 A1 | 7/2003 | Nguyen et al. | |
| 2003/0168217 A1 | 9/2003 | Zhang et al. | |
| 2003/0196805 A1 | 10/2003 | Boney | |
| 2003/0224165 A1 | 12/2003 | Anderson et al. | |
| 2004/0010267 A1 | 1/2004 | Nakamura et al. | |
| 2004/0023818 A1 | 2/2004 | Nguyen et al. | |
| 2004/0129923 A1 | 7/2004 | Nguyen et al. | |
| 2004/0138343 A1 | 7/2004 | Campbell et al. | |
| 2004/0211561 A1 | 10/2004 | Nguyen et al. | |
| 2005/0018193 A1 | 1/2005 | Chilese et al. | |
| 2005/0019574 A1 | 1/2005 | McCrary | |
| 2005/0028979 A1 | 2/2005 | Brannon et al. | |
| 2005/0034861 A1 | 2/2005 | Saini et al. | |
| 2005/0173116 A1 | 8/2005 | Nguyen et al. | |
| 2005/0244641 A1 | 11/2005 | Vincent | |
| 2005/0244658 A1 | 11/2005 | Bae et al. | |
| 2005/0274523 A1 | 12/2005 | Brannon et al. | |
| 2006/0035790 A1 | 2/2006 | Okell et al. | |
| 2006/0073980 A1 | 4/2006 | Brannon et al. | |
| 2006/0157243 A1 | 7/2006 | Nguyen | |
| 2006/0241198 A1 | 10/2006 | Motz et al. | |
| 2006/0243441 A1 | 11/2006 | Cornelius de Grood et al. | |
| 2006/0260808 A1 | 11/2006 | Weaver et al. | |
| 2006/0283599 A1 | 12/2006 | Nguyen et al. | |
| 2006/0292345 A1 | 12/2006 | Dave et al. | |
| 2007/0021309 A1 | 1/2007 | Bicerano | |
| 2007/0034373 A1 | 2/2007 | McDaniel et al. | |
| 2007/0036977 A1 | 2/2007 | Sinclair et al. | |
| 2007/0066742 A1 | 3/2007 | Mhetar et al. | |
| 2007/0073590 A1 | 3/2007 | Cosentino et al. | |
| 2007/0079965 A1 | 4/2007 | Nguyen et al. | |
| 2007/0088137 A1 | 4/2007 | Georgeau et al. | |
| 2007/0161515 A1 | 7/2007 | Bicerano | |
| 2007/0204992 A1 | 9/2007 | Davis et al. | |
| 2007/0207186 A1 | 9/2007 | Scanlon et al. | |
| 2007/0208156 A1 | 9/2007 | Posey et al. | |
| 2007/0209794 A1 | 9/2007 | Kaufman et al. | |
| 2007/0215354 A1 | 9/2007 | Rickman et al. | |
| 2007/0228322 A1 | 10/2007 | Chaves et al. | |
| 2007/0289781 A1 | 12/2007 | Rickman et al. | |
| 2008/0011478 A1 | 1/2008 | Welton et al. | |
| 2008/0063868 A1 | 3/2008 | Chung et al. | |
| 2008/0087429 A1 | 4/2008 | Brannon et al. | |
| 2008/0202744 A1 | 8/2008 | Crews et al. | |
| 2008/0202750 A1 | 8/2008 | Rediger et al. | |
| 2008/0226704 A1 | 9/2008 | Kigoshi et al. | |
| 2008/0230223 A1 | 9/2008 | McCrary et al. | |
| 2008/0236825 A1 | 10/2008 | Barmatov et al. | |
| 2008/0318812 A1 | 12/2008 | Kakadjian, Sr. et al. | |
| 2009/0029097 A1 | 1/2009 | Riddle et al. | |
| 2009/0044942 A1 | 2/2009 | Gupta | |
| 2009/0176667 A1 | 7/2009 | Nguyen | |
| 2009/0238988 A1 | 9/2009 | McDaniel et al. | |
| 2010/0065271 A1 | 3/2010 | McCrary et al. | |
| 2010/0105817 A1 | 4/2010 | Arkles et al. | |
| 2010/0132943 A1 | 6/2010 | Nguyen et al. | |
| 2010/0147507 A1 | 6/2010 | Korte et al. | |
| 2010/0196621 A1 | 8/2010 | Larson-Smith et al. | |
| 2010/0212898 A1 | 8/2010 | Nguyen et al. | |
| 2010/0282462 A1 | 11/2010 | Xu et al. | |
| 2010/0286000 A1 | 11/2010 | Huang et al. | |
| 2011/0016837 A1 | 1/2011 | Fischer et al. | |
| 2011/0024129 A1 | 2/2011 | Turakhia et al. | |
| 2011/0053809 A1 | 3/2011 | Sanders et al. | |
| 2011/0120719 A1 | 5/2011 | Soane et al. | |
| 2011/0160097 A1 | 6/2011 | Mirzaei et al. | |
| 2011/0162837 A1 | 7/2011 | O'Malley et al. | |
| 2011/0244125 A1 | 10/2011 | Weisenberg et al. | |
| 2011/0272146 A1 | 11/2011 | Green et al. | |
| 2011/0297383 A1 | 12/2011 | Tanguay et al. | |
| 2012/0018162 A1 | 1/2012 | Tanguay et al. | |
| 2012/0040194 A1 | 2/2012 | Kanai et al. | |
| 2012/0122363 A1 | 5/2012 | Owens | |
| 2012/0267105 A1 | 10/2012 | Zhang | |
| 2012/0267112 A1 | 10/2012 | Zhang et al. | |
| 2012/0277130 A1 | 11/2012 | Usova | |
| 2012/0279703 A1 | 11/2012 | McDaniel et al. | |
| 2012/0283153 A1 | 11/2012 | McDaniel et al. | |
| 2012/0283155 A1 | 11/2012 | Huang et al. | |
| 2012/0295114 A1 | 11/2012 | Rediger et al. | |
| 2012/0318514 A1 | 12/2012 | Mesher | |
| 2012/0322925 A1 | 12/2012 | Arigo et al. | |
| 2013/0005856 A1 | 1/2013 | Phonthammachai et al. | |
| 2013/0037048 A1 | 2/2013 | Edgington et al. | |
| 2013/0045901 A1 | 2/2013 | Bicerano | |
| 2013/0048365 A1 | 2/2013 | Kim et al. | |
| 2013/0065800 A1 | 3/2013 | McDaniel et al. | |
| 2013/0081812 A1 | 4/2013 | Green et al. | |
| 2013/0095276 A1 | 4/2013 | Dave et al. | |
| 2013/0164449 A1 | 6/2013 | Tadepalli et al. | |
| 2013/0178568 A1 | 7/2013 | Meuler et al. | |
| 2013/0184381 A1 | 7/2013 | Bilodeau et al. | |
| 2013/0186624 A1 | 7/2013 | McCrary et al. | |
| 2013/0203917 A1 | 8/2013 | Harris et al. | |
| 2013/0233545 A1 | 9/2013 | Mahoney et al. | |
| 2013/0312974 A1 | 11/2013 | McClung, IV | |
| 2014/0060826 A1 | 3/2014 | Nguyen | |
| 2014/0060831 A1 | 3/2014 | Miller | |
| 2014/0060832 A1 | 3/2014 | Mahoney et al. | |
| 2014/0116698 A1 | 5/2014 | Tang et al. | |
| 2014/0144631 A1 | 5/2014 | Weaver et al. | |
| 2014/0162911 A1 | 6/2014 | Monastiriotis et al. | |
| 2014/0262247 A1 | 9/2014 | Duenckel et al. | |
| 2014/0274819 A1 | 9/2014 | McCrary et al. | |
| 2014/0305650 A1 | 10/2014 | Song et al. | |
| 2014/0338906 A1 | 11/2014 | Monastiriotis et al. | |
| 2015/0034314 A1 | 2/2015 | Hudson et al. | |
| 2015/0119301 A1 | 4/2015 | McDaniel et al. | |
| 2015/0175750 A1 | 6/2015 | Hopkins et al. | |
| 2015/0196940 A1 | 7/2015 | Aizenberg et al. | |
| 2015/0322335 A1 | 11/2015 | Lawrence | |
| 2016/0137904 A1 | 5/2016 | Drake et al. | |
| 2016/0177129 A1 | 6/2016 | McCarthy et al. | |
| 2016/0251803 A1 | 9/2016 | Tuteja et al. | |
| 2016/0376496 A1 | 12/2016 | Gershanovich et al. | |
| 2017/0015835 A1 | 1/2017 | Aizenberg et al. | |
| 2017/0015892 A1 | 1/2017 | Nguyen et al. | |

FOREIGN PATENT DOCUMENTS

| | | |
|---|---|---|
| CA | 2574808 C | 12/2010 |
| CA | 2858920 A1 | 6/2013 |

(56) References Cited

FOREIGN PATENT DOCUMENTS

| | | |
|---|---|---|
| CN | 1149007 A | 5/1997 |
| CN | 101641211 A | 2/2010 |
| CN | 102203211 B | 12/2013 |
| CN | 103889706 A | 6/2014 |
| DE | 102010051817 A1 | 5/2012 |
| EP | 0207668 A1 | 1/1987 |
| EP | 0544303 A3 | 9/1993 |
| EP | 2440630 A1 | 4/2012 |
| EP | 2469020 A1 | 6/2012 |
| GB | 1294017 A | 10/1972 |
| MX | 2013012807 A | 8/2014 |
| WO | 2001033039 A1 | 5/2001 |
| WO | 2005075551 A1 | 8/2005 |
| WO | 2005121272 A1 | 12/2005 |
| WO | 2010049467 A1 | 5/2010 |
| WO | 2013048365 A1 | 4/2013 |
| WO | 2013112251 A1 | 8/2013 |
| WO | 2013158306 A1 | 10/2013 |
| WO | 2014144464 A2 | 9/2014 |
| WO | 2016144361 A1 | 9/2016 |
| WO | 2016176350 A1 | 11/2016 |

OTHER PUBLICATIONS

Notice of Allowance dated Jun. 12, 2017 in U.S. Appl. No. 14/266,179.
Non-final Office Action dated Jul. 12, 2017 in U.S. Appl. No. 14/798,774.
Final Office Action dated Jun. 26, 2017 in U.S. Appl. No. 14/673,340.
Non-final Office Action dated Aug. 29, 2017 in U.S. Appl. No. 15/003,118.
Non-final Office Action dated Sep. 8, 2017 in U.S. Appl. No. 14/713,235.
Notice of Allowance dated Sep. 12, 2017 in U.S. Appl. No. 15/073,840.
Final Office Action dated Oct. 24, 2017 U.S. Appl. No. 15/461,694.
Nonfinal Office Action dated Oct. 4, 2017 received in U.S. Appl. No. 13/897,288.
Non-final Office Action dated Nov. 24, 2017 in U.S. Appl. No. 15/070,819.
Non-final Office Action dated Jan. 19, 2018 in U.S. Appl. No. 15/345,283.
AkzoNobel Declaration of Compliance Bindzil CC401, Eka Chemical, Jan. 27, 2010, pp. 1-4.
AkzoNobel Silane Modified Colloidal Silca Bindzil CC in Waterborne Coating Applications Use and Benefits, 2011, pp. 1-6.
Boster, Ronald S., A Study of Ground-Water Contamination Due to Oil-Field Brines in Morrow and Delaware; Counties, Ohio, With Emphasis on Detection Utilizing Electrical Resistivity Techniques, The Ohio State University,; 1967.
Cao et al., Mesoporous SiO2-supported Pt Nanoparticles for catalytic application, ISRN Nanomaterials, 2013, Article ID 745397, 7 pages.
Carbo Ceramics, Topical Reference, Physical Properites of Proppants, 2011, pp. 1-5.
EPA, Oil and Gas Extraction, Compliance and Enforcement History, Sector Notebook Project, Oct. 2000, pp. 115-155.
Halimoon, Removal of heavy metals from textile wastewater using zeolite, Environment Asia, 2010, 3(special issue):124-130.
Hui et al., Removal of mixed heavy metal ions in wasterwater by zeolite 4A and residual products from recycled coal fly ash, Jounal of Hazardous Materials, Aug. 1, 2005, vol. B124, pp. 89-101.
Huntsman, JEFFCAT Amine Catalysts for the Polyurethane Industry, Americas Region, 2010, pp. 1-4.
Huntsman, Performance Products, JEFFCAT catalysts for the polyurethane industry, Asia Pacific, 2010, pp. 1-6.
Huntsman, The JEFFAMINE Polyetheramines, 2007.
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.
Interstate Oil and Gas Compact Commission and All Consulting, a Guide to Practical Management of Produced; Water from Onshore Oil and Gas Operations in the United States, Oct. 2006.
Kuang et al., Controllable fabrication of SnO2-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Notice of Allowance dated Dec. 22, 2015 in U.S. Appl. No. 13/626,055.
Official Action dated Nov. 30, 2015 from U.S. Appl. No. 14/798,774.
Polyurethanes, Ullmann's Encyclopedia of Industrial Chemistry, 2012, vol. 29.
Sanchez, Mariano, FRAC Packing: Fracturing for Sand Control, Middle East and Asia Reservoir Review, Nov. 8, 2007, pp. 37-49.
The removal of heavy metals cations by natural zeolites; retrieved from the internet http://www.resultsrna.com/research/zeolite_binds_heavy_metals.php; Aug. 31, 2011.
Wikipedia, ion-exchange resin, en.wikipedia.org/wikiIon_exchange_resins, pp. 1-5, undated.
Wikipedia, Methylene diphenyl diisocyanate, retrieved from the internet http://en.wikipedia.org/wiki/Methylene_diphenyl_diisocyanate; Jul. 21, 2011.
Wikipedia, Piezoelectricity, en.wikipedia.org.wiki/Piezoelectricity, pp. 1-15, undated.
Wingenfelder et al., Removal of heavy metals from mine waters by natural zeolites, Environ Sci Technol, 2005, 39:4606-4613.
Non-Final Office Action dated Mar. 18, 2016 in U.S. Appl. No. 13/355,969.
Non-Final Office Action dated Apr. 5, 2016 in U.S. Appl. No. 14/314,573.
Non-Final Office Action dated Apr. 5, 2016 in U.S. Appl. No. 13/897,288.
Final Office Action dated Apr. 29, 2016 in U.S. Appl. No. 14/798,774.
Final Office Action dated May 3, 2016 in U.S. Appl. No. 14/266,179.
Final Office Action dated May 27, 2016 in U.S. Appl. No. 13/837,396.
Notice of Allowance dated Aug. 8, 2016 in U.S. Appl. No. 13/837,396.
Non-Final Office Action dated Aug. 25, 2016 in U.S. Appl. No. 15/073,840.
Sigma-Aldrich, "Polybutadiene, hydroxyl terminated" Jun. 8, 2014, https://web.archive.org/web/20140608155646/http:product/alddrich/190799?lang=en&region=).
Chemicalland21, "Lauryl alcohol ethoxylates" Mar. 18, 2006, https://web.archive.org/web/20060318023334/http://www.chemicalland21.com/specialtychem/perchem/lauryl%20alcohol%20ethoxylate.htm.
Ramirez et al., Synthesis of crosslinked and functionalized polystyrene by miniemulsion polymerization: particle size control, Macromex 2014.
Notice of Allowance dated Oct. 31, 2016 in U.S. Appl. No. 13/355,969.
Notice of Allowance dated Nov. 9, 2016 in U.S. Appl. No. 14/015,629.
Non-final Office Action dated Dec. 6, 2016 in U.S. Appl. No. 14/673,340.
Notice of Allowance dated Dec. 8, 2016 in U.S. Appl. No. 14/314,573.
Dewprashad et al., Modifying the proppant surface to enhance fracture condictivity, Society of Petroleum Engineers 1999 SPE50733.
Weaver et al., Sustaining Conductivity, Society of Petroleum Engineers 2006 SPE98236.
Samuel et al., Gelled Oil: new chemistry using surfactants, SPE International 2005 SPE 97545.
Momentive Safety Data Sheet, 2015.
Final Office Action dated Jan. 4, 2017 in U.S. Appl. No. 13/897,288.
Non-final Office Action dated Feb. 17, 2017 in U.S. Appl. No. 14/713,235.

(56) References Cited

OTHER PUBLICATIONS

Non-final Office Action dated Apr. 27, 2017 in U.S. Appl. No. 15/073,840.
Final Office Action dated Jan. 18, 2018 in U.S. Appl. No. 14/528,070.
Notice of Allowance dated May 17, 2018 in U.S. Appl. No. 15/461,694.
Nonfinal Office Action dated Jun. 21, 2018 received in U.S. Appl. No. 15/153,099.
Non-final Office Action dated Jun. 26, 2018 in U.S. Appl. No. 15/709,781.
Final Office Action dated Jul. 6, 2018 in U.S. Appl. No. 15/070,819.
Notice of Allowance dated Aug. 6, 2018 in U.S. Appl. No. 13/897,288.
Nonfinal Office Action dated Mar. 16, 2018 in U.S. Appl. No. 14/713,236.
Final Office Action dated Mar. 15, 2018 in U.S. Appl. No. 14/798,774.
Non-Final Office Action dated Feb. 4, 2019 in U.S. Appl. No. 15/070,819.
Final Office Action dated Mar. 19, 2019 in U.S. Appl. No. 15/153,099.
Non-final Office Action dated Sep. 13, 2018 in U.S. Appl. No. 14/673,340.
Final Office Action dated Apr. 12, 2019 in U.S. Appl. No. 14/673,340.
Non-Final Office Action dated Jul. 25, 2019 in U.S. Appl. No. 14/928,379.
Non-final Office Action dated Jul. 18, 2019 in U.S. Appl. No. 15/572,877.
Notice of Allowance dated Sep. 12, 2019 in U.S. Appl. No. 15/070,819.
Notice of Allowance dated Dec. 18, 2019 in U.S. Appl. No. 15/153,099.

* cited by examiner

Polyurethane+polycarbonate-polyurethane dispersion

Polyurethane+solvent-free aliphatic polycarbonate polyurethane dispersion

Polyurethane + an aqueous, anionic, solvent-free, low viscous dispersion of an aliphatic polyester-polyurethane without free isocyanate groups

DURABLE COATINGS AND USES THEREOF

CROSS-REFERENCE TO RELATED APPLICATIONS

This application claims priority to U.S. Provisional Application No. 62/426,888, filed Nov. 28, 2016, which is incorporated by reference in its entirety.

BACKGROUND

Well fracturing is an often used technique to increase the efficiency and productivity of oil and gas wells. Overly simplified, the process involves the introduction of a fracturing fluid into the well and the use of fluid pressure to fracture and crack the well strata. The cracks allow the oil and gas to flow more freely from the strata and thereby increase production rates in an efficient manner.

There are many detailed techniques involved in well fracturing, but one of the most important is the use of a solid "proppant" to keep the strata cracks open as oil, gas, water and other fluids found in well flow through those cracks. The proppant is carried into the well with the fracturing fluid which itself may contain a variety of viscosity enhancers, gelation agents, surfactants, etc.

Proppants can be made of virtually any generally solid particle that has a sufficiently high crush strength to prop open cracks in a rock strata at great depth and temperatures of about 125° C. and higher. Sand and ceramic proppants have proved to be especially suitable for commercial use.

A proppant that is flushed from the well is said to have a high "flow back." Flow back is undesirable. In addition to closure of the cracks, the flushed proppants are abrasive and can damage or clog valves and pipelines in downstream processing facilities.

Synthetic resin coatings can be used to impart a degree of adhesion to the proppant so that flow back is substantially reduced or eliminated. Such resins can include phenol resin, epoxy resin, polyurethane-phenol resin, furane resin, etc. See published US Patent Application Nos. 2002/0048676, 2003/0131998, 2003/0224165, 2005/0019574, 2007/0161515 and 2008/0230223 as well as U.S. Pat. Nos. 4,920,192; 5,048,608; 5,199,491; 6,406,789; 6,632,527; 7,624,802; and published international application WO 2010/049467, the disclosures of which are herein incorporated by reference.

Proppants based on polyurethane chemistries have a number of potential advantages over coating systems. However, polyurethane coated proppants also have disadvantages in that they can be not as durable as some other coatings. The present embodiments solves these issues and others as will be apparent from the present disclosure.

SUMMARY

In some embodiments, coated particulates are provided. In some embodiments, the coatings comprise an inner coating adjacent to the particulate comprising a polyurethane and an outer coating comprising an polyurethane dispersion; a coating comprising a polyurethane admixed with a polyurethane dispersion; or a polyurethane dispersion layer and is free of an inner polyurethane layer.

In some embodiments, methods of preparing a multi-layer coated particulate are provided. In some embodiments, the methods comprise a) coating the particulate with a first layer, wherein the first layer is a polyurethane to produce a polyurethane coated particulate; and coating the polyurethane coated particulate with a second layer to produce the multi-layer coated particulate, wherein the second layer comprises a polyurethane dispersion.

In some embodiments, methods of extracting oil and/or gas from a subterranean stratum are provided, the method comprising injecting into the subterranean stratum the coated particulates described herein; and extracting the oil and/or gas from the subterranean stratum.

DETAILED DESCRIPTION

Figure 1:
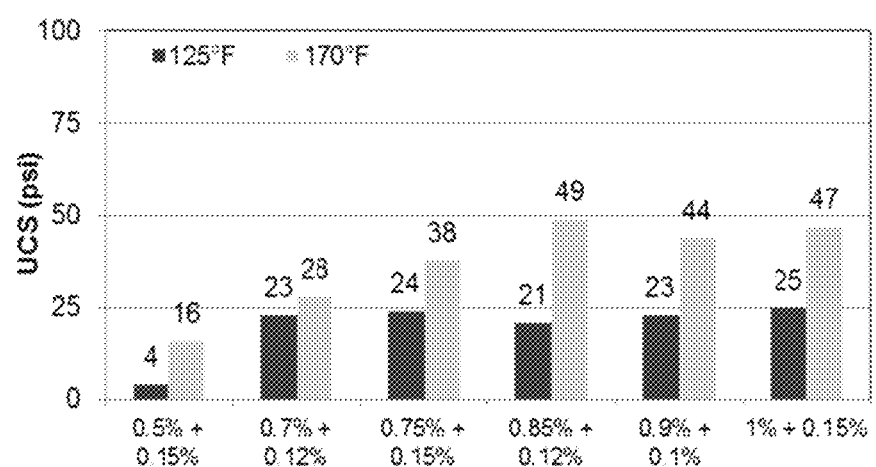
FIG. 1 illustrates a non-limiting embodiments of the improved performance and durability of coatings described herein.

In some embodiments, coated particulates are provided. In some embodiments, the coating comprises an inner coating adjacent to the particulate comprising a polyurethane and an outer coating comprising an polyurethane dispersion; a coating comprising a polyurethane admixed with a polyurethane dispersion; or a polyurethane dispersion layer and is free of an inner polyurethane layer.

In some embodiments, the coating resists dissolution under the rigorous combination of high heat, agitation, abrasion and water found downhole in a well. In some embodiments, the coating exhibits a sufficient resistance to a 10 day autoclave test or 10 day conductivity test so that the coating resists loss by dissolution in hot water ("LOI loss") of less than 25 wt %, less than 15 wt %, or a loss of less than 5 wt %. The multi-layer coating can in some embodiments resist dissolution in the fractured stratum while also exhibiting sufficient resistance to flow back and sufficiently high crush strength to maintain conductivity of the fractures.

In some embodiments, a testing method for the above is described in ISO 13503-5:2006(E) "Procedures for measuring the long term conductivity of proppants", the disclosure of which is herein incorporated by reference. ISO 13503-5:2006 provides standard testing procedures for evaluating proppants used in hydraulic fracturing and gravel packing operations. ISO 13503-5:2006 provides a consistent methodology for testing performed on hydraulic fracturing and/or gravel packing proppants. The "proppants" mentioned henceforth in this part of ISO 13503-5:2006 refer to sand, ceramic media, resin-coated proppants, gravel packing media, and other materials used for hydraulic fracturing and gravel-packing operations. ISO 13503-5:2006 is a non-limiting example of a consistent method by which downhole conditions can be simulated and compared in a laboratory setting The Isocyanate Component In some embodiments, the isocyanate component comprises an isocyanate with at least 1, 2, 3, or 4 reactive isocyanate groups. Other isocyanate-containing compounds may be used, if desired. Examples of suitable isocyanate with at least 2 isocyanate groups an aliphatic or an aromatic isocyanate with at least 2 isocyanate groups (e.g. a diisocyanate, triisocyanate or tetraisocyanate), or an oligomer or a polymer thereof can also be used. These isocyanates with at least 2 isocyanate groups can also be carbocyclic or heterocyclic and/or contain one or more heterocyclic groups. In some embodiments, the isocyanate is a mixture of a diisocyanate or a triisocyanate.

In some embodiments, the isocyanate comprises 4,4'-methylenediphenyl diisocyanate. In some embodiments, the isocyanate comprises 4,4'-methylenediphenyl diisocyanate is present in a concentration amount of about 18 to about 25%. In some embodiments, the isocyanate comprises a diphenylmethane diisocyanate and as described herein.

In some embodiments, the isocyanate with at least 2 isocyanate groups is a compound of the formula (III) or a compound of the formula (IV):

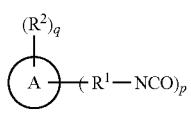

(III)

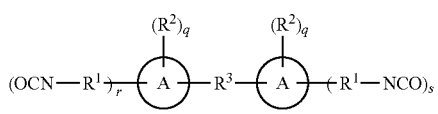

(IV)

In the formulas (III) and (IV), A is each, independently, an aryl, heteroaryl, cycloalkyl or heterocycloalkyl. Preferably, A is each, independently, an aryl or cycloalkyl. More preferably A is each, independently, an aryl which is preferably phenyl, naphthyl or anthracenyl, and most preferably phenyl. Still more preferably A is a phenyl.

The above mentioned heteroaryl is preferably a heteroaryl with 5 or 6 ring atoms, of which 1, 2 or 3 ring atoms are each, independently, an oxygen, sulfur or nitrogen atom and the other ring atoms are carbon atoms. More preferably the heteroaryl is selected among pyridinyl, thienyl, furyl, pyrrolyl, imidazolyl, pyrazolyl, pyrazinyl, pyrimidinyl, pyridazinyl, oxazolyl, isoxazolyl or furazanyl.

The above mentioned cycloalkyl is preferably a $C_{3-10}$-cycloalkyl, more preferably a $C_{5-7}$-cycloalkyl.

The above mentioned heterocycloalkyl is preferably a heterocycloalkyl with 3 to 10 ring atoms (more preferably with 5 to 7 ring atoms), of which one or more (e.g. 1, 2 or 3) ring atoms are each, independently, an oxygen, sulfur or nitrogen atom and the other ring atoms are carbon atoms. More preferably the heterocycloalkyl is selected from among tetrahydrofuranyl, piperidinyl, piperazinyl, aziridinyl, acetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Still more preferably, the heterocycloalkyl is selected from among tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In the formulas (III) and (IV), each $R^1$ is, independently, a covalent bond or $C_{1-4}$-alkylene (e.g. methylene, ethylene, propylene or butylene). Preferably each $R^2$ is a covalent bond.

In the formulas (III) and (IV), each $R^2$ is each, independently, a halogen (e.g. F, Cl, Br or I), a $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is, independently, a $C_{1-4}$-alkyl. More preferably each $R^2$ is methyl.

In the formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each, independently, 0, 1, 2 or 3. Preferably, $R^3$ is a —$CH_2$— group or an —O— group.

In the formula (III), p is equal to 2, 3 or 4, preferably 2 or 3, more preferably 2.

In the formulas (III) and (IV), each q is, independently, an integer from 0 to 3, preferably 0, 1 or 2. When q is equal to 0, the corresponding group A has no substitutent $R^2$, but has hydrogen atoms instead of $R^2$.

In the formula (IV), each r and s are, independently, 0, 1, 2, 3 or 4, wherein the sum of r and s is equal to 2, 3 or 4. Preferably, each r and s are, independently, 0, 1 or 2, wherein the sum of r and s is equal to 2. More preferably, r is equal to 1 and s is equal to 1.

Examples of the isocyanate with at least 2 isocyanate groups are: toluol-2,4-diisocyanate; toluol-2,6-diisocyanate; 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyl-diisocyanate; 2,4'-diisocyanate diphenylether; 5,6-dimethyl-1,3-phenyl-diisocyanate; 2,4-dimethyl-1,3-phenyldiisocyanate; 4,4-diisocyanato-diphenylether; 4,6-dimethyl-1,3-phenyldiisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl) benzol (m-TMXDI); 1,4-bis(isocyanato-1-methylethyl) benzol (p-TMXDI); oligomers or polymers of the above mentioned isocyanate compounds; or mixtures of two or more of the above mentioned isocyanate compounds or oligomers or polymers thereof.

In some embodiments, the isocyanates with at least 2 isocyanate groups are toluol diisocyanate, diphenylmethane diisocyanate, an oligomer based on toluol diisocyanate or an oligomer based on diphenylmethane diisocyanate.

The Polyol Component

In some embodiments, the polyurethane is formed by reacting the isocyanate component with a polyol component. The polyol component may or may not have reactive amine functionality. In some embodiments, the polyol is a mixture of a polyol and a polyether polyol. In some embodiments, the polyol is a mixture of about 20 to about 30% polyol by weight and the polyether polyol is about 70 to about 80% by weight, wherein the total of the polyol and the polyether polyol is 100%. In some embodiments, the polyurethane coating is a phenolic polyurethane made with a phenolic polyol according to a patent application that was filed with the German Patent Office under no. DE 10 2010 051 817.4 on Nov. 19, 2010 and entitled "Proppant Coating Technology", the disclosure of which is herein incorporated by reference and summarized below in the context of coatings described herein.

In some embodiments, the polyol component comprises a phenol resin that comprises a condensation product of a phenol and an aldehyde, such as formaldehyde. The phenol resin is preferably a resole or novolak phenol resin and more preferably a benzyl ether resin.

The resole-type phenol resin can be obtained, for example, by condensation of phenol or of one or more compounds of the following formula (I), with aldehydes, preferably formaldehyde, under basic conditions.

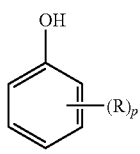
(I)

In the formula (I):
"R" is in each case, independently, a hydrogen atom, a halogen atom, $C_{1-16}$-alkyl (preferably $C_{1-12}$-alkyl, more preferably $C_{1-6}$-alkyl, and still more preferably methyl, ethyl, propyl or butyl) or —OH;
"p" is an integer from 0 to 4, preferably 0, 1, 2 or 3, and more preferably 1 or 2.
Those in the art will understand that when p is 0, the compound of formula (I) is phenol.

Novolak-type phenol resin comprises the condensation product of phenol or of one or more compounds of the formula (I) defined above, with aldehydes, preferably formaldehyde, under acidic conditions.

In some embodiments, the polyol also comprises a polyether polyol.

In some embodiments, the polyol comprises a benzyl ether resin of the general formula (III):

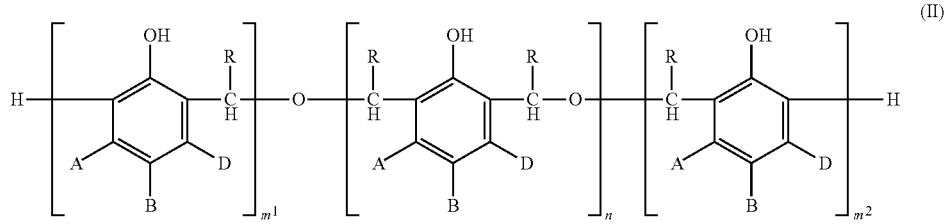
(II)

In the formula (II):
A, B and D each are, independently, a hydrogen atom, a halogen atom, a $C_{1-16}$-hydrocarbon residue, —($C_{1-16}$-alkylene)-OH, —OH, an —O—($C_{1-16}$-hydrocarbon residue), phenyl, —($C_{1-6}$-alkylene)-phenyl, or —($C_{1-6}$-alkylene)-phenylene-OH;
the halogen atom is F, Cl, Br or I;
the $C_{1-16}$-hydrocarbon-residue is $C_{1-16}$-alkyl, $C_{2-16}$-alkenyl or $C_{2-16}$-alkinyl, or $C_{1-12}$-alkyl, $C_{2-12}$-alkenyl or $C_{2-12}$-alkinyl, or $C_{1-6}$-alkyl, $C_{2-6}$-alkenyl or $C_{2-6}$-alkinyl, or $C_{1-4}$-alkyl, $C_{2-4}$-alkenyl or $C_{2-4}$-alkinyl, or $C_{1-12}$-alkyl, $C_{1-6}$-alkyl, or methyl, ethyl, propyl or butyl, or methyl;
The residue —($C_{1-16}$-alkylene)-OH is —($C_{1-12}$-alkylene)-OH, —($C_{1-6}$-alkylene)-OH, —($C_{1-4}$-alkylene)-OH, or a methylol group (—$CH_2$—OH);
The —O—($C_{1-16}$-hydrocarbon)-residue is $C_{1-16}$-alkoxy, $C_{1-12}$-alkoxy, $C_{1-6}$-alkoxy, $C_{1-4}$-alkoxy, —O—$CH_3$, —O—$CH_2CH_3$, —O—($CH_2$)$_2CH_3$ or —O—($CH_2$)$_3CH_3$;
The residue —($C_{1-6}$-alkylene)-phenyl can be —($C_{1-4}$-alkylene)-phenyl, or —$CH_2$-phenyl;
The residue —($C_{1-6}$-alkylene)-phenylene-OH can be —($C_{1-4}$-alkylene)-phenylene-OH, or —$CH_2$-phenylene-OH;
R is a hydrogen atom of a $C_{1-6}$-hydrocarbon residue (e.g. linear or branched $C_{1-6}$-alkyl). In some embodiments, R is a hydrogen atom. This is the case, for example, when formaldehyde is used as aldehyde component in a condensation reaction with phenols in order to produce the benzyl ether resin of the formula (II);

$m^1$ and $m^2$ are each, independently, 0 or 1.
n is an integer from 0 to 100, preferably an integer from 1 to 50, more preferably from 2 to 10, and still more preferably from 2 to 5; and
wherein the sum of n, $m^1$ and $m^2$ is at least 2.

In some embodiments, the polyol component is a phenol resin with monomer units based on cardol and/or cardanol. Cardol and cardanol are produced from cashew nut oil which is obtained from the seeds of the cashew nut tree. Cashew nut oil consists of about 90% anacardic acid and about 10% cardol. By heat treatment in an acid environment, a mixture of cardol and cardanol is obtained by decarboxylation of the anacardic acid. Cardol and cardanol have the structures shown below:

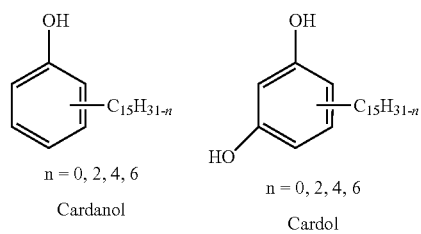

Cardanol $\qquad$ Cardol

As shown in the illustration above, the hydrocarbon residue (—$C_{15}H_{31-n}$) in cardol and/or in cardanol can have one (n=2), two (n=4) or three (n=6) double bonds. Cardol specifically refers to compound CAS-No. 57486-25-6 and cardanol specifically to compound CAS-No. 37330-39-5.

Cardol and cardanol can each be used alone or at any particular mixing ratio in the phenol resin. Decarboxylated cashew nut oil can also be used.

Cardol and/or cardanol can be condensed into the above described phenol resins, for example, into the resole- or novolak-type phenol resins. For this purpose, cardol and/or cardanol can be condensed e.g. with phenol or with one or more of the above defined compounds of the formula (I), and also with aldehydes, such as formaldehyde.

The amount of cardol and/or cardanol which is condensed in the phenol resin is not particularly restricted and preferably is from about 1 wt % to about 99 wt %, more preferably about 5 wt % to about 60 wt %, and still more preferably about 10 wt % to about 30 wt %, relative to 100 wt % of the amount of phenolic starting products used in the phenol resin.

In another embodiment, the polyol component is a phenol resin obtained by condensation of cardol and/or cardanol with aldehydes, preferably formaldehyde.

A phenol resin which contains monomer units based on cardol and/or cardanol as described above, or which can be obtained by condensation of cardol and/or cardanol with aldehydes, has a particularly low viscosity and can thus preferably be employed with a low addition or without addition of reactive thinners. Moreover, this kind of longchain, substituted phenol resin is comparatively hydrophobic, which results in a favorable shelf life of the coated proppants obtained process described herein. In addition, a phenol resin of this kind is also advantageous because cardol and cardanol are renewable raw materials.

Apart from the phenol resin, the polyol component can still contain other compounds containing hydroxyl groups. The other compounds containing hydroxyl groups can be selected from the compounds containing hydroxyl groups that are known to be useful for making polyurethanes, e.g., polyether polyols, hydroxy-functional polyethers, hydroxy-functional polyesters, alcohols or glycols. In some embodiments, compound containing hydroxyl groups is, for instance, a polyether polyol.

The amount of the other compounds containing hydroxyl groups depends on the desired properties of the proppant coating and can suitably be selected by the person skilled in the art. In some embodiments, compounds containing hydroxyl groups are in the range of between about 10 wt % and about 80 wt %, preferably from about 20 wt % to about 70 wt %, relative to 100 wt % of the polyol component or as described herein.

In some embodiments, the polyurethane layer is based upon a condensation reaction product that has been made with an excess of isocyanate component with respect to the polyol component. For example, in some embodiments 100 parts by weight of the polyol component is used with about 105 wt % and about 300 wt %, preferably about 110 wt % to about 230 wt %, more preferably about 120 wt % to about 220 wt %, and still more preferably about 130 wt % to about 200 wt %, of the isocyanate base value. Depending upon the factors being considered the weight can be the absolute weight or the functional weight of the isocyanate and polyol components.

Thus, in some embodiments, the isocyanate base value defines the amount of the isocyanate component which is equivalent to 100 parts by weight of the polyol component. The NCO-content (%) of the isocyanate component is defined herein according to DIN ISO 53185. To determine the OH-content (%) of the polyol component, first the so-called OH-number is determined in mg KOH/g according to DIN ISO 53240 and this value is divided by 33, in order to determine the OH-content.

In some embodiments, an excess of NCO-groups or absolute weight in the isocyanate component of between about 5 and about 200%, about 10 to about 130%, about 20% to about 120%, about 30% to about 100%, relative to the OH-groups in the polyol component or the weight of the polyol component is used (corresponding to the above mentioned amount of isocyanate component of about 105% to about 300%, about 110% to about 230%, about 120% to about 220%, about 130% to about 200% of the isocyanate weight or base value).

In some embodiments, the isocyanate that is used to form the polyurethane has an equivalent weight of about 140. In some embodiments, the hydroxyl equivalent of the polyol that is used to form the polyurethane layer is about 85.

In some embodiments, one or more additives can be mixed with the proppant, the polyol component and the isocyanate component. These additives are not particularly restricted and can be selected from the additives known in the specific field of coated proppants. Provided that one of these additives has hydroxyl groups, it should be considered as a different hydroxyl-group-containing compound, as described above in connection with the polyol component. If one of the additives has isocyanate groups, it should be considered as a different isocyanate-group-containing compound. Additives with hydroxyl groups and isocyanate groups can be simultaneously considered as different hydroxyl-group-containing compounds and as different isocyanate-group-containing compounds.

In some embodiments, the coating comprises a reactive amine component, such as, but not limited to, an amine-terminated compound. This component can enhance cross-link density within the coating and, depending on component selection, can provide additional characteristics of benefit to the cured coating. In some embodiments, the amine components for include, but are not limited to, amine-terminated compounds such as diamines, triamines, amine-terminated glycols such as the amine-terminated polyalkylene glycols.

Non-limiting examples of diamines include primary, secondary and higher polyamines and amine-terminated compounds. Suitable compounds include, but are not limited to, ethylene diamine; propylenediamine; butanediamine; hexamethylenediamine; 1,2-diaminopropane; 1,4-diaminobutane; 1,3-diaminopentane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1,3- and/or 1,4-cyclohexane diamine; 1-amino-3,3,5-trimethyl-5-aminomethyl-cyclohexane; 2,4- and/or 2,6-hexahydrotoluylene diamine; 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers).

Mixtures of polyamines may also be employed in preparing aspartic esters, which is a secondary amine derived from a primary polyamine and a dialkyl maleic or fumaric acid ester. Representative examples of useful maleic acid esters include dimethyl maleate, diethyl maleate, dibutyl maleate, dioctyl maleate, mixtures thereof and homologs thereof.

Suitable triamines and higher multifunctional polyamines include, but are not limited to, diethylene triamine, triethylenetetramine, and higher homologs of this series.

JEFFAMINE diamines include the D, ED, and EDR series products. The D signifies a diamine, ED signifies a diamine with a predominately polyethylene glycol (PEG) backbone, and EDR designates a highly reactive, PEG based diamine. See also U.S. Pat. Nos. 6,093,496; 6,306,964; 5,721,315; 7,012,043; and Publication U.S. Patent Application No. 2007/0208156 the disclosure of which are hereby incorporated by reference.

Optional Amine-Based Latent Curing Agents

Amine-based latent curing agents can also be added to the coating formulation in the isocyanate component, the polyol component, the amine-reactive polyol component or added simultaneously as any of these components or pre-coated on the proppant. Suitable amine-based latent curing agents include, but are not limited to, triethylenediamine; bis(2-dimethylaminoethyl)ether; tetramethylethylenediamine; pentamethyldiethylenetriamine; and other tertiary amine products of alkyleneamines. Additionally, other catalysts that promote the reaction of isocyanates with hydroxyls and amines that are known by the industry can be used.

Polyurethane Dispersion Component

As described herein, the coated particulate can be coated with a polyurethane dispersion. The dispersion can be coated onto the particulate itself in a separate layer that is coated on top of an inner polyurethane layer or it can be coated onto the particulate with the polyurethane layer at the same time. In some embodiments, the polyurethane dispersion is coated onto a particulate without an inner polyurethane layer.

In some embodiments, the polyurethane dispersion is an aqueous polyurethane dispersion. In some embodiments, the polyurethane dispersion is siloxane-polyurethane dispersion. Without being bound to any particular theory, the presence of the siloxane groups allows the dispersion to crosslink to one another by a dehydration step or as the dispersion dries and water is evaporated.

In some embodiments, the polyurethane dispersion is a polycarbonate-polyurethane dispersion. In some embodiments, the polycarbonate-polyurethane dispersion is free of organic solvents and emulsifiers. In some embodiments, the polyurethane dispersion is a polyether-polyurethane dispersion. In some embodiments, the polyurethane dispersion is a polyester/acrylic polyurethane dispersion. In some embodiments, the polyurethane dispersion is an aliphatic polycarbonate polyurethane dispersion. In some embodiments, the polyurethane dispersion is an aqueous, anionic, solvent-free, low viscous dispersion of an aliphatic polyester-polyurethane substantially free of free isocyanate groups. In some embodiments, the polyurethane dispersion is an aqueous, anionic, solvent-free, low viscous dispersion of an aliphatic polyester-polyurethane without free isocyanate groups. In some embodiments, the polyurethane dispersion is an aqueous, colloidal, anionic, low viscous dispersion of an aliphatic polyester-polyurethane without free isocyanate groups. In some embodiments, the polyurethane dispersion is an aqueous, anionic, solvent-free dispersion of an aliphatic polyesterpolyurethane. In some embodiments, the polyurethane dispersion is a self-crosslinking polycarbonate/polyester polyurethane dispersion. In some embodiments, the polyurethane dispersion is a polyisocyanate crosslinked polycarbonate/polyester polyurethane dispersion. In some embodiments, the polyurethane dispersion is a polyester, self-crosslinking polyurethane dispersion. In some embodiments, the polyurethane dispersion is a solvent-free self-crosslinking acrylated polyurethane dispersion. In some embodiments, the polyurethane dispersion is a waterborne, aliphatic polyurethane dispersion, free of solvents and emulsifiers. In some embodiments, the polyurethane dispersion is a polyester polyurethane dispersion.

In some embodiments, the polyurethane dispersion is free of organic solvents. In some embodiments, the polyurethane dispersion is free of emulsifiers.

In some embodiments, the polyurethane dispersion has a König hardness of about 50 to about 170. In some embodiments, polyurethane dispersion has a König hardness of about 50 to about 100. In some embodiments, the polyurethane dispersion has a König hardness of about 70 to about 80. In some embodiments, the polyurethane dispersion has a König hardness of about 100 to about 170. In some embodiments, the polyurethane dispersion has a König hardness of about 120 to about 140. In some embodiments, the polyurethane dispersion has a König hardness of about 150 to about 170. In some embodiments, the polyurethane dispersion has a König hardness of about 160. In some embodiments, the polyurethane dispersion has a König hardness of about 130. In some embodiments, the polyurethane dispersion has a König hardness of about 70.

In some embodiments, the polyurethane dispersion is Alberdingk Boley U 6100 (is an aqueous, colloidal, anionic, low viscous dispersion of an aliphatic polyester-polyurethane without free isocyanate groups); Alberdingk Boley U 8001 (an aqueous, anionic, solvent-free, low viscous dispersion of an aliphatic polyester-polyurethane without free isocyanate groups); Alberdingk Boley U 6150 (a solvent-free aliphatic polycarbonate polyurethane dispersion), Alberdingk Boley U 9150 (solvent free, self-crosslinking polycarbonate/polyester polyurethane dispersion), Alberdingk Boley U 9370 (a polyester polyurethane dispersion), Alberdingk Boley U 9900 (aqueous, anionic, solvent-free dispersion of an aliphatic polyesterpolyurethane), Takelac™ WS-4000 (polycarbonate-polyurethane dispersion), Takelac™ WS-5100 (polycarbonate-polyurethane dispersion), Takelac™ WS-5661 (polycarbonate-polyurethane dispersion), Takelac™ WS-6021 (polyether-polyurethane dispersion), Allnex 1265/36WA (aqueous, solvent-free self-crosslinking polyurethane dispersion), Allnex 6462/36WA (a solvent-free self-crosslinking acrylated polyurethane dispersion), Allnex 6490/35WA, or 7000/40WA, or any combination thereof.

In some embodiments, the polyurethane dispersion is crosslinked. It can be, for example, crosslinked by a dehydration step, a drying step, or be crosslinked with a chemical crosslinker. In some embodiments, the chemical crosslinker is an aziridine crosslinker. In some embodiments, the aziridine crosslinker is trimethylolpropane tris(2-methyl-1-aziridine propionate).

Additives

The particulate coating compositions may also include various additives. For example, the coatings may also include pigments, tints, dyes, and fillers in an amount to provide visible coloration in the coatings. Other materials conventionally included in coating compositions may also be added to the compositions. These additional materials include, but are not limited to, reaction enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers and other conventional additives. All of these materials are well known in the art and are added for their usual purpose in typical amounts. For example, the additives are preferably present in an amount of about 15 weight percent or less. In one embodiment, the additive is present in an amount of about 5 percent or less by weight of the coating composition.

Other additives can include, for example, solvents, softeners, surface-active agents, molecular sieves for removing the reaction water, thinners and/or adhesion agents can be used. Silanes are a particularly preferred type of adhesion agent that improves the affinity of the coating resin for the surface of the proppant. Silanes can be mixed in as additives in step (a), but can also be converted chemically with reactive constituents of the polyol component or of the isocyanate component. Functional silanes such as amino-silanes, epoxy-, aryl- or vinyl silanes are commercially available and, as described above, can be used as additives or can be converted with the reactive constituents of the polyol component or of the isocyanate component. In particular, amino-silanes and epoxy-silanes can be easily converted with the isocyanate component.

Proppant Core Solids

The proppants can be virtually any small solid with an adequate crush strength and lack of chemical reactivity. Suitable examples include sand, ceramic particles (for instance, aluminum oxide, silicon dioxide, titanium dioxide, zinc oxide, zirconium dioxide, cerium dioxide, manganese dioxide, iron oxide, calcium oxide or bauxite), or also other granular materials. The proppants to be coated preferably have an average particle size within the range from about 50 m and about 3000 m, and more preferably within the range from about 100 m to about 2000 m.

Coating Methods

In some embodiments, methods of preparing a multi-layer coated particulate are provided. In some embodiments, the method comprises coating the particulate with a first layer. In some embodiments, the first layer is a polyurethane layer. In some embodiments, the polyurethane layer is formed from the reaction of an isocyanate component and a polyol component. In some embodiments, the isocyanate component is as described herein. In some embodiments, the polyol component is as described herein.

In some embodiments, polyurethane coated particulate is coated with an outer layer that is a polyurethane dispersion. The polyurethane dispersion can be, for example, as described herein. In some embodiments, the layers are coated onto the particulate by mixing the components and the particulate in a mixer. For example, in some embodiments, the first layer is produced by mixing the particulate with a polyol component and an isocyanate component under conditions sufficient to form the polyurethane coating coated onto the particulate.

In some embodiments, the particulates are preheated sufficient to evaporate any water present in the coating components or dispersions. In some embodiments, the methods comprises drying the multi-layer coated particulate. In some embodiments, the methods comprise crosslinking the second layer (e.g., polyurethane dispersion layer) to produce a cross-linked second layer. In some embodiments, the crosslinking comprises drying the second layer coated particulate to crosslink the polyurethane dispersion. In some embodiments, the crosslinking comprises contacting the second layer with a crosslinker, such as the chemicals described herein. In some embodiments, the cross-linking occurs by itself without the addition of an additional cross-linking chemical or component. This can be referred to as self-crosslinking.

In some embodiments, the methods for the production of coated particulates can be implemented without the use of solvents. Accordingly, the mixture one or more, or all of the steps are solvent-free (including but not limited to organic solvents), or is essentially solvent-free. The mixture is essentially solvent-free, if it contains less than 20 wt %, less than 10 wt %, less than 5 wt %, less than 3 wt %, or less than 1 wt % of solvent, relative to the total mass of components of the mixture. In some embodiments, other than the water present in the polyurethane dispersion no additional water is added to the mixer to coat the particulates.

In some embodiments, the method is implemented without the use of organic solvents. In some embodiments, one of the steps is performed without the use of organic solvents. In some embodiments, the inner polyurethane layer is formed free of organic solvents, or is essentially free of organic solvents. The mixture is essentially free of organic solvents, if it contains less than 20 wt %, less than 10 wt %, less than 5 wt %, and less than 3 wt %, or less than 1 wt % of solvent, relative to the total mass of components of the mixture.

In some embodiments, the particulate is heated to an elevated temperature and then contacted (e.g., mixed) with the coating components. In some embodiments, the particulate is heated to a temperature from about 50° C. to about 150° C. The increased temperature can, for example, accelerate crosslinking reactions in the applied coating.

The mixer used for the coating process is not particularly restricted and can be selected from among the mixers known in the specific field. For example, a pug mill mixer or an agitation mixer can be used. For example, a drum mixer, a plate-type mixer, a tubular mixer, a trough mixer or a conical mixer can be used. In some embodiments, the components and formulations are mixed in a rotating drum. In some embodiments a continuous mixer, a worm gear can, for example, be used.

Mixing can be carried out on a continuous or discontinuous basis. It is also possible to arrange several mixers in series, or to coat the proppants in several runs in one mixer.

The temperature of the coating process is not particularly restricted outside of practical concerns for safety and component integrity. In some embodiments, the coating steps are performed at a temperature of between about 10° C. and about 150° C., or about 10° C. to about 125° C., or about 50° C. to about 150° C.

The coating material may be applied in more than one layer. In some embodiments, each of the layers described herein are repeated as necessary (e.g. 1-5 times, 2-4 times or 2-3 times) to obtain the desired coating thickness. Thus, the thickness of the coating of the proppant can be adjusted and used as either a relatively narrow range of proppant size or blended with proppants of other sizes, such as those with more or less numbers of coating layers of polyurethane or polyurethane dispersions as described herein. This can also be used to form a particulate blend have more than one range of size distribution.

In some embodiments, the amount of the polyurethane coating that is applied or coated onto the particulate is about 0.5 wt % to about 10 wt %, about 0.65 wt % to about 1.5 wt %, about 0.75 wt % to about 1.3 wt %, 0.8 wt % to about 1.25 wt %, about 0.8 wt %, about 0.9 wt %, about 1.0 wt %, about 1.1 wt %, about 1.2 wt %, about 1.25 wt %, relative to the mass of the particulate as 100 wt %.

In some embodiments, the amount of the polyurethane dispersion coating that is applied or coated onto the particulate is about 0.1 wt % to about 0.5 wt %, about 0.1 wt %, about 0.15 wt %, about 0.2 wt %, about 0.3 wt %, about 0.4 wt %, about 0.5 wt %, or about 0.25 wt % to about 0.3 wt % relative to the mass of the particulate as 100 wt %.

The coated particulates can additionally be treated with surface-active agents or auxiliaries, such as talcum powder or stearate, to improve pourability.

In some embodiments, the coated particulates can be baked or heated for a period of time sufficient to substantially react at least substantially all of the available isocyanate, hydroxyl that might remain in the coated particulate. Such a post-coating cure may occur even if additional contact time with a catalyst is used after a first coating layer or between layers. Typically, the post-coating cure step is performed like a baking step at a temperature within the range from about 100°-200° C. for a time of about 1-48 hours, or the temperature is about 125°-175° C. for 19-36 hours.

In some embodiments, the coated particulate is cured for a time and under conditions sufficient to produce a coated proppant that exhibits a loss of coating of less than 25 wt %, preferably less than 15 wt %, and even more preferably less than 5 wt % when tested according to ISO 13503-5:2006(E).

Using the Coated Particulates

Furthermore, the embodiments provided herein includes the use of the coated particulates in conjunction with a fracturing liquid for the production of petroleum or natural gas. The fracturing liquid is not particularly restricted and can be selected from among the frac liquids known in the specific field. Suitable fracturing liquids are described, for example, in W C Lyons, G J Plisga, *Standard Handbook Of Petroleum And Natural Gas Engineering*, Gulf Professional Publishing (2005). The fracturing liquid can be, for example, water gelled with polymers, an oil-in-water emulsion gelled with polymers, or a water-in-oil emulsion gelled with polymers. In one preferred embodiment, the fracturing liquid comprises the following constituents in the indicated proportions: 1000 l water, 20 kg potassium chloride, 0.120 kg sodium acetate, 3.6 kg guar gum (water-soluble polymer), sodium hydroxide (as needed) to adjust a pH-value from 9 to 11, 0.120 kg sodium thiosulfate, and 0.180 kg ammonium persulfate.

In addition, methods are provided for the production of petroleum or natural gas which comprises the injection of the coated particulate into the fractured stratum with the fracturing liquid, i.e., the injection of a fracturing liquid which contains the coated particulate, into a petroleum- or natural gas-bearing rock layer, and/or its introduction into a fracture in the rock layer bearing petroleum or natural gas. The method is not particularly restricted and can be implemented in the manner known in the specific field.

In some embodiments, the particulates can be coated at temperatures of about 10° C. and about 150° C. and, for example in some embodiments, in a solvent-free manner. The flow back effect can be controlled and adjusted in a reproducible manner. The coating requires a comparatively little equipment and if necessary can also be carried out on a short-term basis in the vicinity of the bore.

EXAMPLES

Conductivity testing was performed at simulated downhole conditions using the method and procedures found in ISO 13503-5:2006. In such tests, a closure stress is applied across a test unit for 50 hours to allow the proppant sample bed to reach a semi-steady state condition. As the fluid is forced through the proppant bed, the pack width, differential pressure, temperature and flow rates are measured at each stress. Proppant pack permeability and conductivity are then calculated.

Multiple flow rates are used to verify the performance of the transducers, and to determine Darcy flow regime at each stress; an average of the data at these flow rates is reported. The test fluid is potassium chloride substitute solution filtered to 3 μm absolute. The initial conductivity, permeability and width is measured and compared to the final conductivity, permeability and width after each stress period. Stress is applied and maintained using an Isco 260D. Stress is applied at 100 psi/minute.

Width of the proppant pack is determined by assembling the conductivity cell with the Ohio sandstone wafers and shims without the sample proppants. The distance between the width bars that are attached to each end of the conductivity cells are measured at each of the four corners and recorded. The cells are then assembled with the proppant samples. The measurements are made again at the beginning and ending of each stress period. Width is determined by subtracting the average of the zero from the average of each of the stress width values. Conductivity is calculated using Darcy's equation.

Conductivity; $kW_f = 26.78 \, \mu Q/(\Delta P)$

Permeability; $k = 321.4 \, \mu Q/[(\Delta P)W_f]$ wherein:

k is the proppant pack permeability, expressed in Darcy's;
$kW_f$ is the proppant pack conductivity, expressed in milli-darcy-feet
μ is the viscosity of the test liquid at test temperature, expressed in centipoises;
Q is the flow rate, expressed in cubic centimeters per minute;
$\Delta P$ is the differential pressure, expressed in psi;
$W_f$ is proppant pack width, expressed in inches.

Sieve analysis is performed using the procedure found in ISO 13503-2 "Measurements of proppants used in hydraulic fracturing and gravel pack operations" Standard US mesh screens are used to separate the sample by size. Not more than 0.1% should be greater than the first specified sieve and not more than 1% should be retained in the pan. There should be at least 90% retained in the specified screens.

To determine the magnitude of "LOI" loss during the conductivity test, samples of the proppant pack are taken, dried in an oven and weighed. They are then subjected to a temperature of 960 C for 2.5 hours. At the end of this period the samples are cooled and weighed again. The difference between the sample weight after drying but before being subjected to the furnace compared to the sample weight after the time in the furnace, equates to the coating weight. Comparing this number to the same test performed on a sample of the coated material before being subjected to the conductivity test, will equate to the coating weight lost due to the long term exposure to the conditions of the conductivity tests.

The procedure used in an autoclave test would be as follows:

The autoclave test utilizes what amounts to a pressure cooker to subject the coated sands to a hot wet environment that is above the boiling temperature of water. Approximately 20 g of sample is placed in a jar along with 150 ml of distilled water. The lids are placed on sample jars but not tightened. The samples are placed in the autoclave and the chamber is sealed. Heat is applied until the autoclave temperature reaches 250-265° F. (121°-129° C.). The samples are maintained under these conditions for the ten day period. At the end of the test period the autoclave is cooled down, opened and the sample jars removed. Each sample is washed with distilled water and then placed in an oven to dry. The dried samples are then put through a standard test for determination of LOI. This result is compared a the results of an LOI test that was run on the original sample. The difference in LOI before and after the autoclave test, quantifies the amount of LOI dissolved by the exposure to a hot water environment.

Example 1

Figure 2:
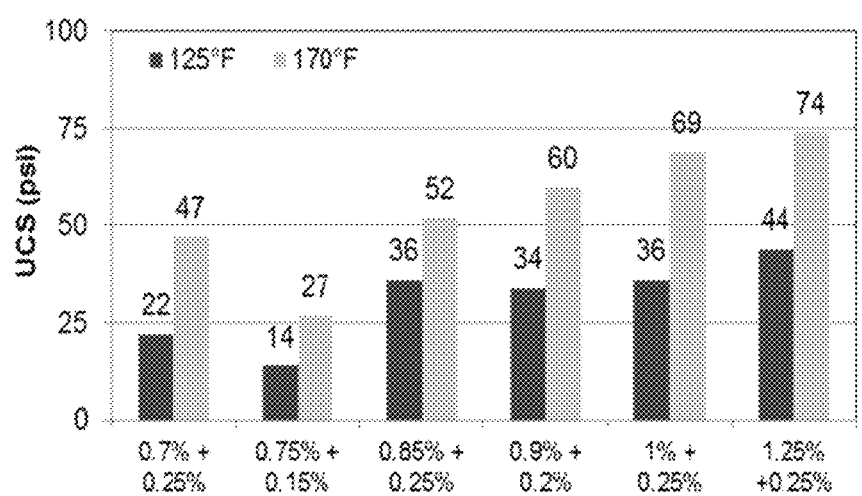
FIG. 2 illustrates a non-limiting embodiments of the improved performance and durability of coatings described herein.
Figure 3:
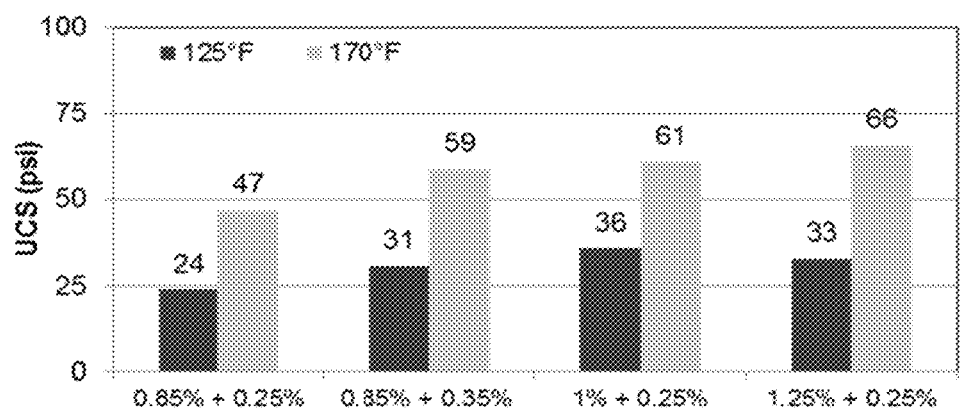
FIG. 3 illustrates a non-limiting embodiments of the improved performance and durability of coatings described herein.

Sand was coated with a polyurethane inner layer and a polyurethane dispersion outer layer. The polyurethane was formed by the reaction of a diisocyanate and a polyol comprising a polyol and a polyether polyol. The coatings were layered onto the particulate sequentially (polyurethane first and then the polyurethane dispersion) with the percentages as shown in the figures below. The first percentage is the wt % of the polyurethane coating and the second percentage is the dispersion coating as indicated. UCS was measured at the different temperatures as indicated. The coatings performed significantly better than particulates coated without the dispersion outer layer as discussed below and illustrated in FIG. 1, FIG. 2, and FIG. 3.

Without being bound to any particular theory, these examples demonstrate that bond strength increases with increasing total LOI and that polyurethane loading level affects more for the bond strength at higher temperature (170 F).

The sands coated with the polyurethane and polyurethane dispersions had improved performance and the coating was found to be durable.

It must also be noted that as used herein and in the appended claims, the singular forms "a", "an", and "the" include plural reference unless the context clearly dictates otherwise.

As used in this document, terms "comprise," "have," and "include" and their conjugates, as used herein, mean "including but not limited to." While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Various references and patents are disclosed herein, each of which are hereby incorporated by reference for the purpose that they are cited.

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

What is claimed:

1. A method of extracting oil or gas from a subterranean stratum, the method comprising:
   injecting into the subterranean stratum coated particulates, and
   extracting the oil or gas from the subterranean stratum,
   wherein the coated particulate comprises an inner layer polyurethane coating adjacent to the particulate and an outer layer polyurethane dispersion coating.

2. The method of claim 1, wherein the polyurethane is formed from a reaction of a polyol and an isocyanate.

3. The method of claim 2, wherein the isocyanate is at least a diisocyanate.

4. The method of claim 2, wherein the isocyanate is a mixture of a diisocyanate and a triisocyanate.

5. The method of claim 2, wherein the isocyanate comprises 4,4'-methylenediphenyl diisocyanate.

6. The method of claim 5, wherein the 4,4'-methylenediphenyl diisocyanate is present in a concentration amount of about 18 to about 25%.

7. The method of claim 2, wherein the isocyanate comprises a diphenylmethane diisocyanate.

8. The method of claim 2, wherein the polyol is a mixture of a polyol and a polyether polyol.

9. The method of claim 8, wherein the polyol is a mixture of about 20 to about 30% polyol by weight and the polyether polyol is about 70 to about 80% by weight, wherein the total of the polyol and the polyether polyol is 100%.

10. The method of claim 1, wherein the polyurethane dispersion is an aqueous polyurethane dispersion, siloxane-polyurethane dispersion, polycarbonate-polyurethane dispersion, polyether-polyurethane dispersion, polyester/acrylic polyurethane dispersion, or an aliphatic polycarbonate polyurethane dispersion.

11. The method of claim 10, wherein the polycarbonate-polyurethane dispersion is free of organic solvents and emulsifiers.

12. The method of claim 1, wherein the polyurethane dispersion is an aqueous, anionic, solvent-free, low viscous dispersion of an aliphatic polyester-polyurethane substantially free of free isocyanate groups.

13. The method of claim 1, wherein the polyurethane dispersion is:
   an aqueous, anionic, solvent-free, low viscous dispersion of an aliphatic polyester-polyurethane without free isocyanate groups;
   an aqueous, colloidal, anionic, low viscous dispersion of an aliphatic polyester-polyurethane without free isocyanate groups;
   an aqueous, anionic, solvent-free dispersion of an aliphatic polyesterpolyurethane;
   a self-crosslinking polycarbonate/polyester polyurethane dispersion;
   a polyisocyanate crosslinked polycarbonate/polyester polyurethane dispersion;
   a polyester, self-crosslinking polyurethane dispersion; or
   a solvent-free self-crosslinking acrylated polyurethane dispersion.

14. The method of claim 1, wherein the polyurethane dispersion is a waterborne, aliphatic polyurethane dispersion, free of solvents and emulsifiers.

15. The method of claim 1, wherein the polyurethane dispersion is a polyester polyurethane dispersion.

16. The method of claim 1, wherein the polyurethane dispersion is crosslinked with an aziridine crosslinker.

17. The method of claim 1, wherein the particulate is sand.

18. The method of claim 1, wherein the coated particulate is prepared by a method comprising:
   a) coating the particulate with a first layer, wherein the first layer is a polyurethane to produce a polyurethane coated particulate; and
   b) coating the polyurethane coated particulate with a second layer to produce the multi-layer coated particulate, wherein the second layer comprises a polyurethane dispersion.

19. The method of claim 18, wherein the method for preparing the coated particulate is free of solvent, or essentially solvent-free.

20. The method of claim 18, wherein the coated particulate is sand.

* * * * *